United States Patent [19]

Nagamatsu et al.

[11] Patent Number: 4,665,775
[45] Date of Patent: May 19, 1987

[54] SPEED RATIO CONTROL FOR A STEPLESSLY VARIABLE TRANSMISSION

[75] Inventors: Hiroaki Nagamatsu; Takashige Ebisumoto, both of Hiroshima, Japan

[73] Assignee: Mazda Motor Corporation, Hiroshima, Japan

[21] Appl. No.: 665,885

[22] Filed: Oct. 29, 1984

[30] Foreign Application Priority Data

Oct. 29, 1983 [JP] Japan ................ 58-203347

[51] Int. Cl.⁴ .................. B60K 41/12; F16H 11/06
[52] U.S. Cl. .......................... 74/868; 474/12; 474/28
[58] Field of Search .............. 474/11, 12, 17, 18, 474/28, 70; 74/863, 864, 865, 866, 867, 868

[56] References Cited

U.S. PATENT DOCUMENTS 4,458,560 7/1984 Frank et al. ............ 74/866 X
4,459,879 7/1984 Miki et al. .............. 74/866
4,536,171 8/1985 Tanaka et al. ........... 474/28

FOREIGN PATENT DOCUMENTS 45-23768 8/1970 Japan .
57-552 4/1983 Japan .................. 474/18

Primary Examiner—Leslie Braun
Assistant Examiner—David Novais
Attorney, Agent, or Firm—Fleit, Jacobson, Cohn & Price

[57] ABSTRACT

A steplessly variable transmission of a belt-pulley type of which speed ratio is controlled in accordance with the vehicle speed and the engine load. A control system is provided for controlling the speed ratio, when the engine throttle valve is fully closed for deceleration, in accordance with the vehicle speed so that the speed ratio is decreased in response to a decrease in the vehicle speed. The control system provides an engine brake effect in deceleration which changes in accordance with a change in the vehicle speed.

8 Claims, 9 Drawing Figures

SPEED RATIO CONTROL FOR A STEPLESSLY VARIABLE TRANSMISSION

BACKGROUND OF THE INVENTION

1. Field of the Invention

The present invention relates to a control of a steplessly variable transmission for motor vehicles, and more particularly to a control system for a steplessly variable transmission wherein the speed ratio of the transmission is controlled in accordance with vehicle operating conditions. More specifically, the present invention pertains to a transmission speed ratio control for making it possible to develop an engine brake function.

2. Description of Prior Art

In motor vehicles having steplessly variable transmissions, it has been proposed to provide measures for making it possible to develop an engine brake function. For example, Japanese patent publication No. 45-23768 discloses a speed ratio control system for a steplessly variable transmission which includes a hydraulic actuator for controlling the speed ratio of the transmission and a control valve for controlling the hydraulic pressure to the actuator in accordance with the engine speed and the position of the engine throttle valve so that the speed ratio can be adjusted in accordance with the engine operating condition. In order that an effective engine brake function can be developed in an operation wherein the engine throttle valve is closed, the Japanse patent publication proposes a mechanism in which the control valve is shifted to one extreme position when the engine throttle valve is closed so that the actuator is moved to the position wherein it maintains the highest speed ratio of the transmission.

The system as proposed by the Japanese patent publication thus provides a predetermined, that is, the highest speed ratio of the transmission when the engine throttle valve is closed so that a maximum rate of engine brake function is always obtained. The proposed system, however, cannot satisfactorily comply with actual demands in vehicle operations. In fact, demands for engine brake functions depend on vehicle speeds. For example, a greater engine brake function is desired under a high vehicle speed than under a low vehicle speed so that there is a demand to change the rate of engine brake in accordance with the vehicle speed.

OBJECT OF THE INVENTION

It is therefore an object of the present invention to provide a transmission speed ratio control system wherein the speed ratio is determined under a minimum engine output condition in accordance with the vehicle speed.

Another object of the present invention is to provide a speed ratio control system for a steplessly variable vehicle transmission which can meet the demands for engine brake functions in vehicle operations.

SUMMARY OF THE INVENTION

According to the present invention, the above and other objects can be accomplished by a steplessly variable transmission device for motor vehicles comprising a steplessly variable transmission mechanism of which the speed ratio can be changed steplessly, a hydraulic actuator means for determining the speed ratio of the transmission mechanism, a valve means for controlling the supply of hydraulic pressure to the actuator means, a valve control means for controlling the valve means in accordance with the vehicle operating conditions, the valve control means includes engine brake control means comprising an engine condition detecting means for detecting that the engine is at a minimum output condition, a vehicle speed detecting means for detecting vehicle speed and a signal producing means responsive to the outputs from the engine condition detecting means and the vehicle speed detecting means for producing a valve control signal which changes in accordance with the vehicle speed so that the speed ratio of the transmission device is changed depending on the vehicle speed when the engine is at the minimum output condition. Preferably, the speed ratio is decreased in response to a decrease in the vehicle speed so that the engine brake effect is weakened. The valve control means may produce a hydraulic pressure signal which constitutes the valve control signal which is applied to the valve means. The pressure signal may be a governor pressure which changes in response to a change in the vehicle speed and is applied to the valve means in a direction of increasing the speed ratio of the transmission mechanism.

DESCRIPTION OF THE PREFERRED EMBODIMENT

Figure 1:
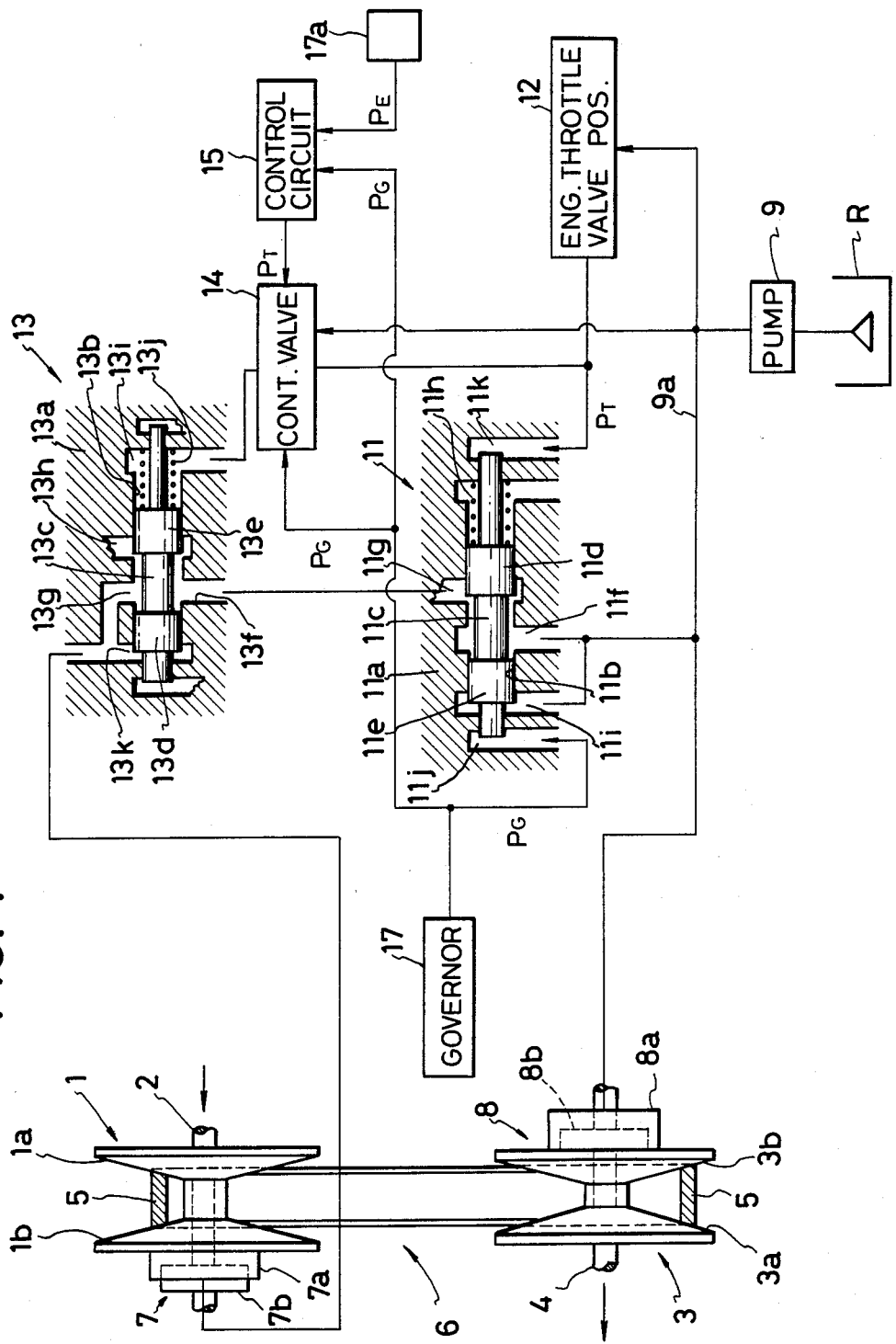
FIG. 1 is a schematic illustration of a belt-pulley type transmission and its speed ratio control system in accordance with one embodiment of the present invention.

Referring to the drawings, particularly to FIG. 1, there is shown a belt-pulley type steplessly variable transmission 6 including a primary pulley assembly 1, a secondary pulley assembly 3 and an endless belt 5 extending between the pulley assemblies 1 and 3. The primary pulley assembly 1 comprises a stationary flange 1a integrally formed with an input shaft 2 which is adapted to be connected with an engine output shaft (not shown). On the input shaft 2, there is mounted a movable flange 1b which is slidable in the axial direction with respect to the stationary flange 1a and the input shaft 2. The flanges 1a and 1b have frustoconical side surfaces which are opposed to each other to form a circumferential groove of V-shaped cross-section. The movable flange 1b is formed at the outer side with a cylinder 7a which slidably receives a piston 7b secured to the input shaft 2. The cylinder 7a and the piston 7b form an actuator 7 for the primary pulley assembly 1.

The secondary pulley assembly 3 comprises a stationary flange 3a formed integrally with an output shaft 4 and a movable flange 3b mounted on the output shaft 4 for axially slidable movement with respect to the stationary flange 3a and the output shaft 4. The flanges 3a and 3b have frustoconical side surfaces which are opposed to each other to form a circumferential groove of V-shaped cross-section. On the outer side of the movable flange 3b, there is formed a cylinder 8a which axially slidably receives a piston 8b secured to the output shaft 4 to form an actuator 8 for the secondary pulley assembly 3. The endless belt 5 is passed around the primary and secondary pulley assemblies 1 and 3 and engaged with the circumferential grooves of the pulley assemblies. By controlling the hydraulic pressure applied to the actuator 7, it is possible to adjust the effective diameter of the primary pulley assembly 1 and therefore the speed ratio of the transmission 6. Hydraulic pressure applied to the actuator 8 on the secondary pulley assembly 3 functions to maintain the tension in the belt 5.

In FIG. 1, there is further shown a hydraulic circuit for controlling the speed ratio of the transmission 6. The hydraulic circuit includes a hydraulic pump 9 having an outlet port connected with a pressure line 9a which is in turn connected with the actuator 8 for the secondary pulley assembly 3. In the pressure line 9a, there is provided a pressure regulating valve 11 which functions to produce a regulated pressure in accordance with a governor pressure representing the vehicle speed and a throttle pressure which represents the position of the engine throttle valve (not shown). The pressure regulating valve 11 has a valve body 11a formed with a valve bore 11b in which a valve spool 11c is axially slidably received. The valve spool 11c has a pair of axially spaced lands 11d and 11e and the valve body 11a is formed with a pressure port 11f located between the lands 11d and 11e. The valve body 11a is further formed with an exhaust port 11g which is adapted to be controlled by the land 11d of the spool 11c. The spool 11c is biased by a spring 11h toward left as seen in FIG. 1. At the left side of the land 11e, the valve body is formed with a chamber 11i which is connected with the pressure line 9a. Further, at the both ends of the spool 11c, the valve body 11a is formed with a left chamber 11j and a right chamber 11k.

Figure 5A:
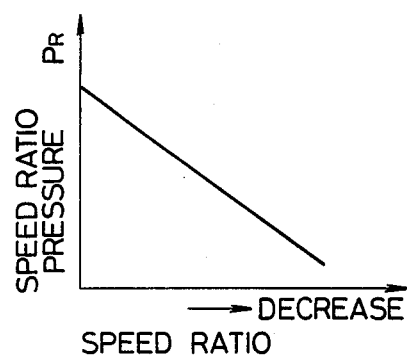
FIG. 5A is a diagram showing the relationship between the speed ratio pressure and the speed ratio of the transmission.
Figure 5B:
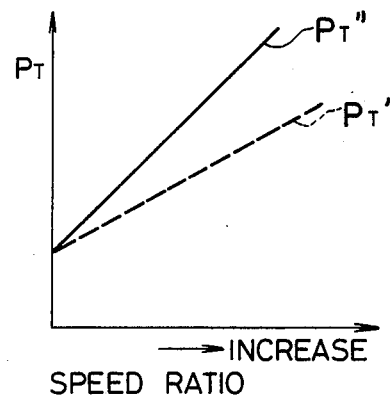
FIG. 5B is a diagram showing the relationship between the throttle pressure and the speed ratio.
Figure 5C:
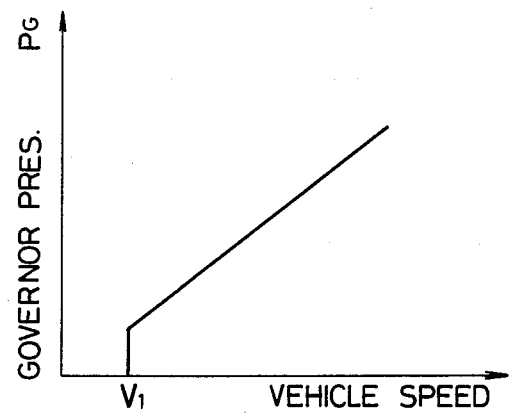
FIG. 5C is a diagram showing the relationship between the governor pressure and the vehicle speed.

An engine throttle valve position sensing valve 12 is provided for producing a hydraulic pressure which is referred as the throttle pressure PT and corresponds to the position of the engine throttle valve (not shown). The throttle pressure PT from the valve 12 is introduced into the right chamber 11k. Further, a governor valve 17 is provided for producing a hydraulic pressure which is referred as the governor pressure PG and corresponds to the vehicle speed as shown in FIG. 5c. The governor valve 17 may be of any conventional type which is widely used in vehicle automatic transmissions. The governor pressure PG is applied to the chamber 11j. It will therefore be understood that the position of the valve spool 11c is determined by the throttle pressure PT and the force of the spring 11h which functions to force the spool 11c toward the left, and the line pressure in the chamber 11i and the governor pressure PG which functions to force spool 11c to control the opening of the exhaust port 11g.

The hydraulic circuit further includes a second pressure regulating valve 13 which has a valve body 13a formed with a valve bore 13b and a valve spool 13c axially slidably received in the valve bore 13b. The spool 13c has a pair of axially spaced lands 13d and 13e and the valve body 13a is formed with an inlet port 13f and outlet port 13g which are located between the lands 13d and 13e. The valve body 13a is further formed with a drain port 13h connected with a reservoir R and adapted to be controlled by the land 13e. At the right side of the land 13e, the valve body 13a is formed with a chamber 13i in which a spring 13j is provided to force the spool 13c toward left to thereby decrease the opening of the drain port 13h. At the left side of the land 13d, the valve body 13a is formed with a chamber 13k which is connected with the outlet port 13g. The inlet port 13f is connected with the exhaust port of the first pressure regulating valve 11. The outlet port 13g is connected with the actuator 7 of the primary pully assembly 1.

There is provided a control valve 14 which produces a sped ratio control signal pressure as will be described in detail. The signal pressure is applied to the chamber 13i of the pressure regulating valve 13 so that the pressure in the outlet port 13g of the valve 13 increases as the signal pressure increases to thereby increase the effective diameter of the primary pulley assembly 1. This will results in a decrease in the speed ratio of the transmission 6. It will be noted that the pressure in the exhaust port 11g of the first pressure regulating valve 11 is substantially the same as that in the outlet port 13g of the second pressure regulating valve 13. Thus, the pressure in the pressure line 9a is adjusted to a valve which is dependent on the governor pressure, the throttle pressure and the pressure applied to the actuator 7 of the primary pulley assembly 1.

Figure 2:
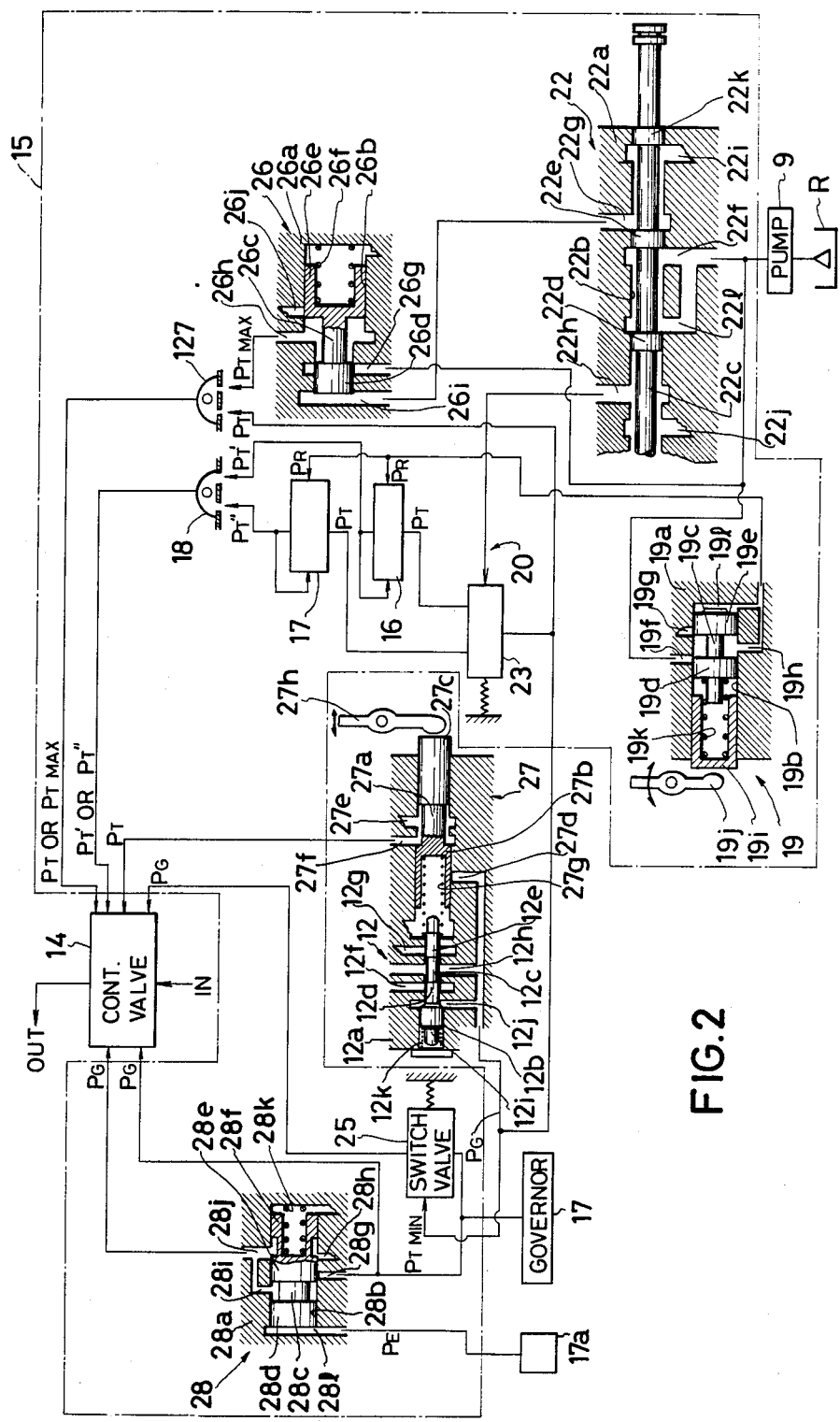
FIG. 2 is a system diagram showing details of the speed ratio control system.
Figure 2A:
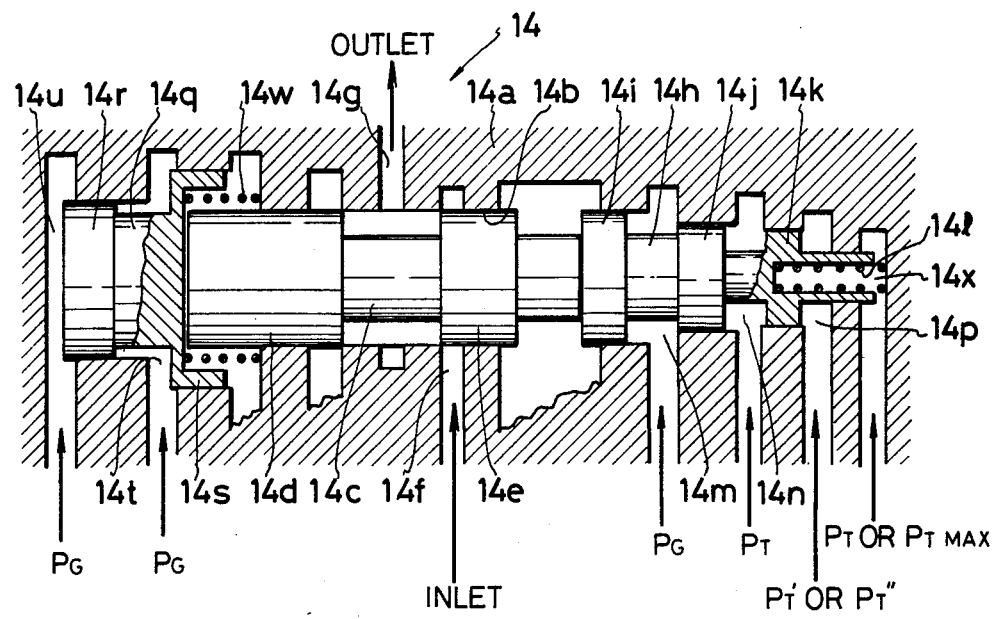
FIG. 2A is a sectional view of the control valve in a circuit shown in FIG. 2.

Referring to FIG. 2, there is shown in detail a control circuit for controlling the control valve 14. As shown in FIG. 2A, the control valve 14 includes a valve body 14a formed with a valve bore 14b in which a spool 14c is axially slidably received. The spool 14c has a pair of axially spaced lands 14d and 14e and the valve body 14a is formed with an inlet port 14f which is adapted to be controlled by the right land 14e. The valve body 14a is further formed with an outlet port 14g located between the lands 14d and 14e. At an axial end of the spool 14c adjacent to the land 14e, there is provided a spool shifting plunger 14h which is also received in the valve bore 14b. The plunger 14h has three axially spaced lands 14i, 14j and 14k which are arranged in this order from an end adjacent to the spool 14c. The land 14i has the largest diameter, the land 14j a medium diameter and the land 14k the smallest diameter. A spring 14l is provided to force the plunger 14h toward left so that the spool 14c is shifted leftward to a position wherein the land 14e blocks the inlet port 14f. Between the lands 14i and 14j, there is formed a chamber 14m. Similarly, a chamber 14n is formed between the lands 14j and 14k. At the right side of the land 14k, there is formed a chamber 14p.

Adjacent to the other axial end of the spool 14c, there is provided a second spool shifting plunger 14q which is also received in the valve bore 14b. The plunger 14q has a pair of axially spaced lands 14r and 14s, the land 14s being located adjacent to the spool 14c and larger in diameter than the land 14r. Between the lands 14r and 14s, there is formed a chamber 14t and, at the left side of the land 14r, there is a chamber 14u. A spring 14w is provided in a chamber 14x adjacent to the right end of the spool 14c to force the plunger 14q leftward. Hydraulic pressure applied to anyone of the chambers 14t and 14u serves to force the plunger 14q and therefore the spool 14c toward right to thereby open the inlet port 14f to the space between the lands 14d and 14e. Hydraulic pressure applied to anyone of the chambers 14m, 14n and 14p serves to counteract the pressure in the chambers 14t and 14u. The inlet port 14f is connected with the hydraulic pump 9 whereas the outlet port 14g is connected with the chamber 13i of the second pressure regulating valve 13.

Referring to FIG. 2, the governor pressure PG from the governor valve 17 is applied on one hand directly and on the other hand through an anti-overrun valve 28 to the control valve 14. More specifically, the governor pressure PG is directly applied to the chamber 14t between the lands 14r and 14s and through the anti-overrun valve 28 to the chamber 14u leftside the land 14r. The anti-overrun valve 28 includes a valve body 28a formed with a valve bore 28b which receives a valve spool 28c for axial slidable movement. The spool 28c has three axially spaced lands 28d, 28e and 28f and the valve body 28a is formed with an inlet port 28g and a drain port 28h which are adapted to be controlled by the intermediate land 28e. When the spool 28c is shifted toward right, the inlet port 28g is opened to the space between the left land 28d and the intermediate land 28e. When the spool 28c is shifted toward left, the drain port 28h is opened to the space between the lands 28e and 28f. The valve body 28a is further formed with an outlet port 28i opened to the space between the lands 28d and 28e and an exhaust port 28j opened to the space between the lands 28e and 28f. The inlet port 28g is connected with the governor valve 17 whereas the ports 28i and 28j are connected with the chamber 14u of the control valve 14. The valve 28 is provided at the right end of the spool 28c with a spring 28k which functions to force the spool 28c toward left to open the drain port 28h to the space between the lands 28e and 28f. At the left end of the spool 28c, there is provided a chamber 28l connected with a second governor valve 17a which produces an engine speed pressure PE corresponding to the engine speed. It will therefore be understood that when the engine speed increases beyond a predetermined limit speed, the pressure PE functions to shift the spool 28c toward right to connect the inlet port 28g with the outlet port 28i to thereby direct the governor pressure PG to the chamber 14u for increasing the rightward biasing force to the spool 14c in the control valve 14.

The engine throttle valve position sensing valve 12 includes a valve body 12a formed with a valve bore 12b in which an axially slidable spool 12c is received. The spool 12c has a pair of axially spaced lands 12d and 12e. The valve body 12a is formed with an inlet port 12f adapted to be controlled by the left hand land 12d and a drain port 12g adapted to be controlled by the right hand land 12e. An outlet port 12h is also formed in the valve body 12a to open to a space between the lands 12d and 12e. The inlet port 12f is connected with the hydraulic pump 9 whereas the drain port 12g is connected to the reservoir R. The land 12d is formed at the left portion thereof with a large diameter land 12i to provide a shoulder with the land 12d. The valve body 12a is formed with a chamber 12j facing to the shoulder between the lands 12d and 12i and the chamber 12j is connected with the outlet port 12h. A spring 12k is provided to force the spool 12c toward right so that the inlet port 12f is blocked by the land 12d.

The valve 12 is associated with a kick-down valve 27 which includes a spool 27a located rightward the spool 12c and axially slidable in the valve bore 12b. The spool 27a has a pair of axially spaced lands 27b and 27c and the valve body 12a is formed with an inlet port 27d adapted to be controlled by the land 27b and a main port 27e adapted to be controlled by the land 27c. Further, the valve body 12a is formed with an outlet port 27f opened to a space between the land 27b and 27c. Between the spools 12c and 27a, there is a compression spring 27g. The right hand end of the spool 27a is engaged with a lever 27h which is interconnected with an engine throttle lever actuating mechanism (not shown). It will therefore be understood that the spool 12c is subjected to a leftward biasing force which is applied through the kick-down spool 27a and the spring 27g from the engine throttle lever actuating mechanism in a direction wherein the opening of the inlet port 12f to the outlet port 12h is increased in response to an increase in the engine throttle valve opening. Thus, there is produced in the outlet port 12h the aforementioned throttle pressure PT which corresponds to the engine throttle valve opening. Where the engine is of a type that has no throttle valve, the lever 27a may be connected with an engine output power control mechanism. The ports 27d, 27e and 27f of the kick-down valve 27 are located so that the port 27f is normally opened to the drain port 27e but it is connected with the inlet port 27d when the engine throttle valve is fully opened. The inlet port 27d is connected with the outlet port 12h of the valve 12 and the outlet port 27f is connected with the chamber 14n so that the throttle pressure PT is introduced into the chamber 14n under the full engine throttle valve position.

As shown in FIG. 2, the control circut 15 includes a manual select valve 22 having a valve body 22a formed with a valve bore 22b in which a manually operated spool 22c is axially slidably received. The spool 22c has three axially spaced lands 22d, 22e and 22k and the valve body 22a is formed with inlet ports 22f and 22l. The valve body 22a is further formed with a first outlet port 22g, a second outlet port 22h, and drain ports 22i and 22j. The spool 22c is movable either of an extreme right position which is referred as L-position, an intermediate position which is referred as $D_1$-position and an extreme left position which is referred as $D_2$-position. The ports of the valve 22 are located so that, in the L-position of the spool 22c, the outlet ports 22g and 22h are opened to the drain ports 22i and 22j, respectively. In the $D_1$-position of the spool 22c, the first outlet port 22g is connected with the inlet port 22f and the second outlet port 22h is opened to the drain ports 22. In the $D_2$-position, the inlet port 22f is opened to the first outlet port 22h and the inlet port 22l is opened to the second outlet port 22h. The inlet ports 22f and 22l of the manual select valve 22 are connected with the hydraulic pump 9.

Figure 3:
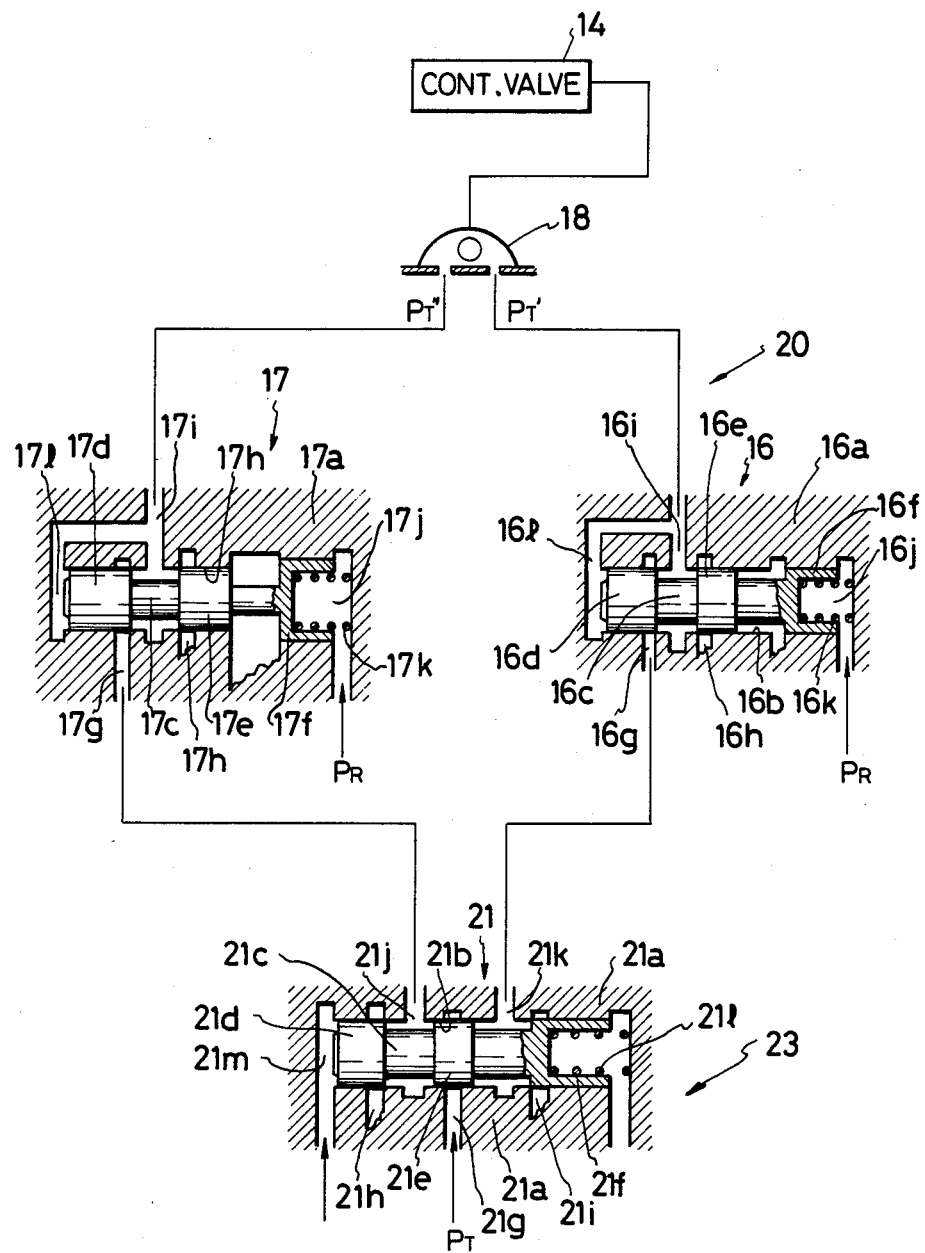
FIG. 3 is a sectional view showing details of the pressure modulating valves and the switching valve.

There is provided a mode changing device 20 in the control circuit 15. The device 20 is constituted by a manual select device 23, and a pair of pressure modulating valves 16 and 17. Referring to FIG. 3, the manual select device 23 is constituted by a switching valve 21 which has a valve body 21a formed with a valve bore 21b in which a spool 21c is axially slidably received. The spool 21c has three axially spaced lands 21d, 21e and 21f. The valve body 21a is formed with an inlet port 21g which is adapted to be controlled by the intermediate land 21e and a pair of drain ports 21h and 21i which are located at the opposite sides of the inlet port 21g and adapted to be controlled respectively by the lands 21d and 21f. Further, the valve body 21a is formed with a first outlet port 21j opening to a space between the lands 21d and 21e and a second outlet port 21k opening to a space between the lands 21e and 21f. At the right end of the spool 21c, there is provided a spring 21l which functions to force the spool 21c leftward. At the left end of the spool 21c, the valve body 21a is formed with a chamber 21m which is connected with the second outlet port 22h of the manual select valve 22 so that the line pressure is applied to the chamber 22m in the $D_2$-position of the select valve 22. The inlet port 21g of the switching valve 21 is connected with the outlet port 12j of the valve 12 so that the throttle pressure PT is drawn to the inlet port 21g. The inlet port 21g is located so that, when the spool 21c is shifted toward left under the influence of the spring 21e, the port 21g is connected with the second outlet port 21k but, when the spool 21c is shifted toward right under the line pressure applied to the chamber 21m, the port 21g is connected with the first outlet port 21j.

The first outlet port 21j is connected with the second modulating valve 17 whereas the second outlet port 21k is connected with the first modulating valve 16. As shown in FIG. 2, the control circuit 15 includes a speed ratio detecting valve 19 which includes a valve body 19a formed with a valve bore 19b in which a spool 19c is slidably received. The spool 19c has a pair of axially spaced lands 19d and 19e and the valve body 19a is formed with an inlet port 19f adapted to be controlled by the left hand land 19d and a drain port 19g adapted to be controlled by the right hand land 19e. The valve body 19a is further formed with an outlet port 19h which is opened to a space between the lands 19d and 19e. Adjacent to the left hand end of the spool 19c, there is provided a shifting plunger 19i which is engaged by a lever 19j responsive to the axial position of the movable flange 1b of the primary pulley assembly 1 so that the shifting plunger 19i is subjected to a biasing force corresponding to the speed ratio of the transmission 6. Between the spool 19c and the plunger 19i, there is a compression spring 19k. At the right hand end of the spool 19c, there is a chamber 19l which is connected with the outlet port 19h. The inlet port 19f is connected with the hydraulic pump 9. The ports 19f and 19g are located so that the inlet port 19f is connected to the outlet port 19h when the spool 19c is shifted toward left under the pressure applied to the chamber 19l but the outlet port 19h is opened to the drain port 19g when the spool 19c is shifted toward right under a force applied from the lever 19j. It will therefore be understood that there is produced in the outlet port 19h a hydraulic pressure which decreases in response to a decrease in the speed ratio of the transmission as shown in FIG. 5A. This pressure will hereinafter be referred as the speed ratio pressure PR.

Referring again to FIG. 3, the first modulating valve 16 includes a valve body 16a formed with a valve bore 16b in which a spool 16c is axially slidably received. The spool 16c has three axially spaced lands 16d, 16e and 16f of the same diameter and the valve body 16a is formed with an inlet port 16g adapted to be controlled by the left hand land 16d and a drain port 16h adapted to be controlled by the intermediate land 16e. The valve body 16a is further formed with an outlet port 16i which opens to a space between the lands 16d and 16e. At the right hand end of the spool 16c, there is a chamber 16j in which a spring 16k is located to force the spool 16c leftward. At the left hand end of the spool 16c, there is formed a chamber 16l which is connected with the outlet port 16i. The inlet port 16g is connected with the second outlet port 21k of the switching valve 21 and the chamber 16j is connected with the outlet port 19h of the speed ratio detecting valve 19 so that the speed ratio pressure PR is introduced therein. When the spool 16c is shifted leftward under the influence of the spring 16k and the speed ratio pressure PR in the chamber 16j. When the spool 16c is shifted rightward under the pressure in the chamber 16l, the inlet port 16g is connected with the outlet port 16i. It will therefore be understood that the throttle pressure PT which has passed through the switching valve 21 is modified by the speed ratio pressure PR and a first modulated pressure PT' is produced in the outlet port 16i.

The second modulating valve 17 has a structure similar to that of the valve 16 so that corresponding parts are designated by the reference numeral 17 with the same affix. In the valve 17, the right hand land 17f is larger in diameter than the other lands 17d and 17e so that the spool 17c receives a larger leftward force by the speed ratio pressure PR than in the valve 16. The inlet port 17g is connected with the first outlet port 21j of the switching valve 21. It will therefore be understood that the valve 17 produces a second modulated pressure PT'' which is larger than the first pressure PT'.

The outlet ports 16i and 17i of the modulating valves 16 and 17, respectively, are connected with a shuttle valve 18 which has an outlet connected with the chamber 14p of the control valve 14. It will therefore be understood that, when the manual select valve 22 is in either of the L or $D_1$-position, the throttle pressure PT is applied to the first modulating valve 16 and the first modulated pressure PT' is applied to the control valve 14. If however the manual select valve 22 is in the $D_2$-position, the throttle pressure PT is applied to the second modulating valve 17 so that the second modulated pressure PT'' is applied to the control valve 14. The modulated pressures PT' and PT'' are shown in FIG. 5B.

The first outlet port 22g of the manual select valve 22 is connected with a high ratio control valve 26. The valve 26 includes a valve body 26a formed with a valve bore 26b in which a spool 26c is axially slidably received. The spool 26c has a pair of axially spaced lands 26d and 26e and is biased by a spring 26f toward left. The valve body 26a has an inlet port 26g adapted to be controlled by the left hand 26d, an outlet port 26h opened to a space between the lands 26d and 26e and a drain port 26j controlled by the right land 26e. At the left side of the spool 26c, there is provided a chamber 26i which is connected with the first outlet port 22g of the manual select valve 22. The inlet port 22g is connected with the hydraulic pump 9. In the L-position of the manual valve 22 wherein the port 22g is drained, the spool 26c is shifted toward left so that the inlet port 26g is opened to the outlet port 26h. Thus, the line pressure is applied to the outlet port 26h. This pressure may be referred as the maximum throttle pressure PT max. In either of the $D_1$ and $D_2$-positions, the line presure is applied to the chamber 26i and the spool 26c is shifted toward right to open the outlet port 26h to the drain port 26h.

The outlet port 26h of the valve 26 is connected to one inlet port of a shuttle valve 127 which has another inlet port connected with the outlet port 12j of the throttle valve position sensing valve 12. When the presure PT max is not produced in the port 26h, the throttle pressure PT is passed through the shuttle valve 127. However, when the pressure PT max is produced in the port 26h, this pressure PT max is passed through the shuttle valve 127. The outlet port of the shuttle valve 127 is connected with the chamber 14x of the control valve 14.

Figure 2B:
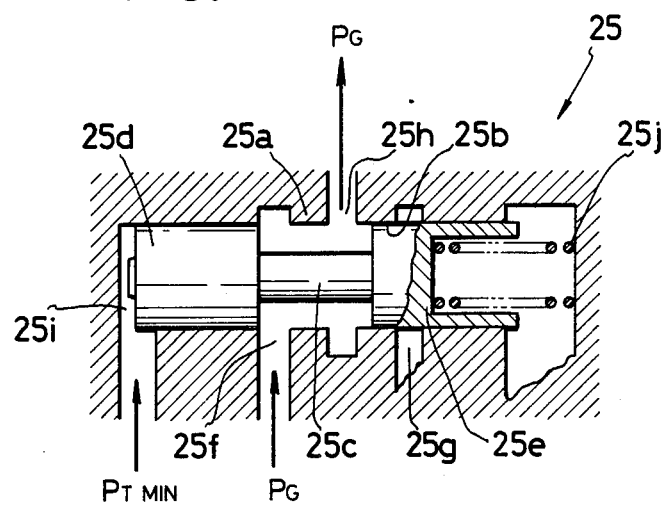
FIG. 2B is a sectional view of the switching valve.

The control circuit 15 further includes a switching valve 25 which includes as shown in FIG. 2B a valve body 25a formed with a valve bore 25b in which spool 25c is axially slidably received. The spool 25c has a pair of axially spaced lands 25d and 25e and biased by a spring 25j toward left. The valve body 25a is formed with an inlet port 25f adapted to be controlled by the left land 25d and a drain port 25g adapted to be controlled by the right land 25e. The valve body 25a is further formed with an outlet port 25h which is opened to a space between the lands 25d and 25e. At the left side of the spool 25c, there is provided a chamber 25i. The inlet port 25f is connected with the governor valve 17 to receive the governor pressure PG. The chamber 25i is connected with the outlet port 12j of the valve 12. The spring 25j of the valve 25 is adjusted so that the spool 25c is normally shifted toward right under the throttle pressure PT applied to the chamber 25i to open the outlet port 25h to the drain port 25g but shifted toward left when the engine throttle valve is closed to connect the inlet port 25f to the outlet port 25h. The outlet port 25h of the valve 25 is connected with the chamber 14m of the control valve 14.

In operation, as far as the engine throttle valve is opened, the switching valve 25 is closed so that the chamber 14m in the control valve 14 is drained. Unless the engine is overrunning, the anti-overrun valve 28 is also closed so that the chamber 14u is also drained. In $D_1$-position of the manual select valve 22, the port 22h is drained so that the port 21g of the switching valve 21 is opened to the port 21k and the first or lower modulating pressure PT' is applied to the chamber 14p. Further, the shuttle valve 127 passes the throttle pressure PT to the chamber 14x. When the vehicle is not in the kickdown condition, the chamber 14n is drained.

Figure 4:
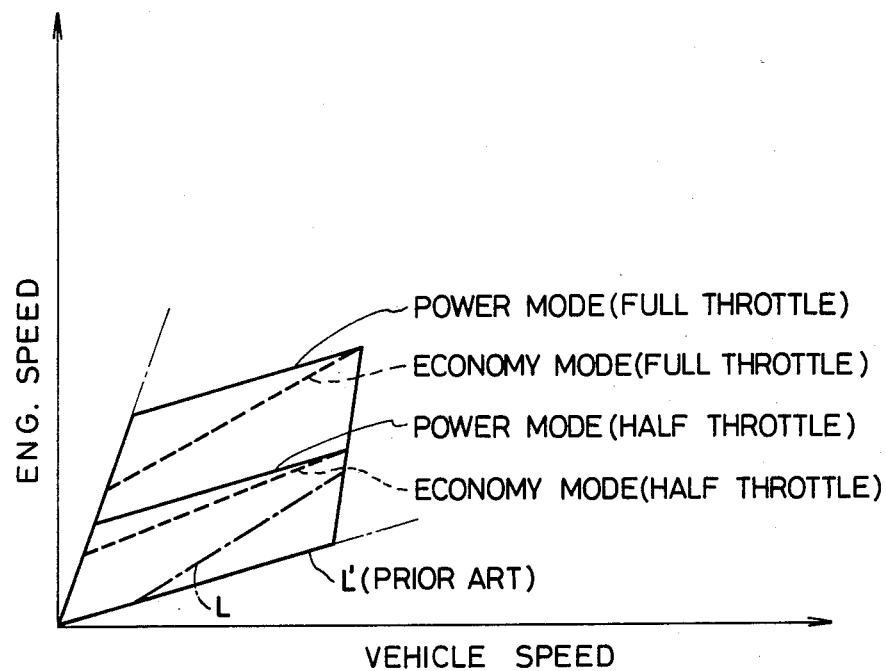
FIG. 4 is a diagram showing the speed ratio control characteristics in the transmission.

The spool 14c of the valve 14 is therefore biased leftward by the first modulated pressure PT' and the throttle pressure PT applied respectively toward the chambers 14p and 14x and rightward by the governor pressure PG applied to the chamber 14t. The pressure in the outlet port 14g decreases as the engine throttle valve opening increases but increases as the vehicle speed increases. The pressure in the outlet port 14g is applied to the chamber 13i of the valve 13 so that an increase in the outlet pressure of the valve 14 causes an increase in the outlet pressure of the valve 13 to thereby increase the effective diameter of the primary pulley assembly 1. This will result in a decrease of the speed ratio. FIG. 4 shows the speed ratio change in accordance with the vehicle speed under different throttle valve positions. In the $D_1$-position of the manual select valve 22, the engine speed changes in response to a change in the vehicle speed as shown by dotted lines. The inclination angle of each line represent the speed ratio. Engine overrun is prevented by the valve 28 which directs the governor pressure PG to the chamber 14u when the engine speed reaches a predetermined valve to thereby increase the outlet pressure of the valve 14. This will cause a decrease in the speed ratio resulting in a decrease in the engine speed. The $D_1$-position of the manual select valve 22 may be called as an economy mode because the vehicle acceleration is relatively moderate as seen in FIG. 4.

In the $D_2$-position of the valve 22, the second or higher modulated pressure PT" is applied to the chamber 14p of the valve 14. This will cause a decrease in the outlet pressure of the control valve 14. Thus, the outlet pressure of the valve 13 is correspondingly decreased and a higher speed ratio is maintained. In this condition, the vehicle is accelerated as shown by solid lines in FIG. 4. This condition may be referred as the power mode because a powerful accelerating is performed.

In the L-position, the line pressure is applied to the chamber 14x so that the leftward biasing force on the spool 14c is further increased. This will cause a decrease in the outlet pressure of the control valve 14 and therefore a decrease in the outlet pressure of the valve 13. Therefore, a higher speed ratio is maintained.

In the illustrated embodiment, the switching valve 25 functions to apply the governor pressure PG to the chamber 14m when the engine throttle valve is closed for deceleration so that the leftward biasing force on the spool 14c is further increased. Thus, the speed ratio of the transmission 6 is maintained at a higher level so that a stronger engine brake function is developed. It should further be noted that, since the governor pressure increases in response to an increase in the vehicle speed, the speed ratio is increased as the vehicle speed increases. This will mean that the engine brake effect becomes stronger as the vehicle speed increases. Since the governor pressure PG changes as shown in FIG. 5c, the speed ratio is returned to a normal value under a predetermined vehicle speed $V_1$. The speed ratio control under deceleration is shown in FIG. 4 by a line L. It will be seen in FIG. 4 that the line L is inclined steeper than a line L' which shows a speed ratio control in a conventional system. Thus, a preferable tendency of change in the engine brake effect can be obtained in the arrangement described above.

The invention has thus been shown and described with reference to a specific embodiment, however, it should be noted that the invention is in no way limited to the details of the illustrated arrangements but changes and modifications may be made without departing from the scope of the appended claims.

We claim:

1. A steplessly variable transmission device for motor vehicles comprising:
    a steplessly variable transmission mechanism of which the speed ratio can be changed steplessly;
    hydraulic actuator means for determining said speed ratio of said transmission mechanism;
    valve means for controlling supply of hydraulic pressure to said actuator means;
    valve control means including vehicle speed detecting means for producing a speed signal relating to vehicle speed;
    engine output detecting means for producing an engine signal relating to engine output;
    first signal producing means for producing a first valve control signal which is applied to said valve means so that said speed ratio is changed as required and which changes in response to said vehicle speed so that said speed ratio is decreased as said vehicle speed increases and in response to said engine output so that said speed ratio is increased as said engine output increases; and
    engine brake control means comprising engine condition detecting means for detecting that the engine is at a minimum output condition, and second signal producing means responsive to outputs from said engine condition detecting means and said vehicle speed detecting means for producing a second valve control signal which is applied to said valve means to increase the speed ratio and which changes in accordance with said vehicle speed so that said speed ratio of said transmission device is increased as said vehicle speed increases when said engine is at the minimum output condition.

2. A transmission device in accordance with claim 1 in which said valve control signal is a hydraulic pressure signal.

3. A transmission device in accordance with claim 2 in which said hydraulic pressure signal is a governor pressure which changes in response to a change in said vehicle speed and applied to said valve means in a direction of increasing said speed ratio of said transmission mechanism.

4. A steplessly variable transmission device in accordance with claim 1 which further includes switch means for transmitting said second valve control signal to said valve control means and means for controlling said switch means in acordance with the signal from said engine condition detecting means.

5. A steplessly variable transmission in accordance with claim 1 in which said second valve control signal is a vehicle speed signal.

6. A steplessly variable transmission device for motor vehicles comprising:
a steplessly variable transmission mechanism of which the speed ratio can be changed steplessly;
hydraulic actuator means for determining said speed ratio of said transmission mechanism;
control valve means for controlling a supply of hydraulic pressure to said actuator means in accordance with said vehicle operating conditions;
engine load detecting means for detecting an engine load and producing an engine load signal pressure which is applied to said control valve means in a direction of increasing said speed ratio in response to an increase in said engine load;
vehicle speed detecting means for detecting vehicle speed and producing a speed signal pressure which is applied to said control valve means in a direction of decreasing said speed ratio in response to an increase in said vehicle speed;
engine brake control means including engine condition detecting means for detecting that said engine is at a minimum output condition and means for additionally applying said speed signal pressure to said control valve means in a direction of increasing said speed ratio in response to an increase in said vehicle speed when said engine is at the minimum output condition so that said speed ratio is decreased in response to a decrease in said vehicle speed.

7. A steplessly variable transmission in accordance with claim 6 which includes signal pressure valve means for passing the speed signal pressure to said control valve means and means for controlling said signal pressure valve means in accordance with said engine load.

8. A steplessly variable transmission device for motor vehicles comprising:
a steplessly variable transmission mechanism of which the speed ratio can be changed steplessly;
actuator means for determining said speed ratio of said transmission mechanism;
control signal generating means for generating a control signal for controlling said actuator means in accordance with said vehicle operating conditions so that the speed ratio is controlled as desired, characterized by engine brake control means including
engine condition detecting means for detecting that said engine is at a minimum output condition,
vehicle speed detecting means for detecting vehicle speed, and
means for generating an engine brake control signal for controlling said actuator means when the engine is at a minimum output condition to increase the speed ratio, said engine brake control signal being responsive to an output of said vehicle speed detecting means so that said speed ratio of said transmission mechanism is decreased in response to a decrease in the vehicle speed to thereby weaken engine brake effect.

* * * * *